United States Patent [19]

Koomey

[11] 4,278,105
[45] Jul. 14, 1981

[54] SPHERICAL ACCUMULATOR WITH BUOYANT FLOAT

[75] Inventor: Paul C. Koomey, Houston, Tex.

[73] Assignee: Koomey, Inc., Houston, Tex.

[21] Appl. No.: 118,467

[22] Filed: Feb. 4, 1980

[51] Int. Cl.³ .................... B67D 5/54; F16K 51/00
[52] U.S. Cl. .................................. 137/207; 137/315; 137/399; 137/423; 137/433; 138/26; 222/67
[58] Field of Search ............. 137/192, 207, 315, 397, 137/398, 399, 430, 433, 423, 391; 138/26, 28, 30; 222/66, 67; 220/85 B

[56] References Cited

U.S. PATENT DOCUMENTS

| 902,335 | 10/1908 | Whittaker | 137/398 |
|---|---|---|---|
| 1,536,686 | 5/1925 | Mullen et al. | 137/192 |
| 2,616,453 | 11/1952 | Green | 138/30 |
| 2,731,038 | 1/1956 | Purcell | 137/398 |
| 2,904,062 | 9/1959 | Techler | 137/391 |
| 3,005,465 | 10/1961 | Whitlock et al. | 137/391 |
| 3,522,013 | 7/1970 | Borgeson | 137/430 |
| 3,593,746 | 7/1971 | Allewitz | 138/30 |
| 3,782,418 | 1/1974 | Zahid | 138/30 |
| 4,080,996 | 3/1978 | Zahid | 138/30 |
| 4,112,978 | 9/1978 | Olbrich et al. | 138/30 |
| 4,186,765 | 2/1980 | Anderson | 137/423 |

Primary Examiner—Martin P. Schwadron
Assistant Examiner—G. L. Walton
Attorney, Agent, or Firm—Pearne, Gordon, Sessions, McCoy & Granger

[57] ABSTRACT

A guided-float accumulator suitable for use with a hydraulic system for an oil well blowout preventer utilizes an array of float elements of syntactic foam material. The float elements are sequentially inserted into the pressure vessel which forms the accumulator proper, and are then manipulated from the exterior of the vessel to be interlocked into a float array.

6 Claims, 4 Drawing Figures

SPHERICAL ACCUMULATOR WITH BUOYANT FLOAT

This invention relates to guided-float accumulators for high pressure (say 3,000 psi or higher) hydraulic systems such as used in oil well blowout preventer control systems. Such accumulators contain a float movable in the accumulator vessel to close a shut-off valve at the bottom of the vessel to prevent the escape of precharged gas (usually nitrogen) from the vessel into the hydraulic system proper when the liquid level within the system becomes low.

Removal and replacement or repair of floats in such accumulators has required that the accumulator vessel itself—a welded pressure vessel—be cut open on a lathe so that the float may be removed and repaired or replaced and put back in the accumulator vessel. The vessel must then be welded up, and must thereafter receive the coded approval of A.S.M.E., or other applicable authority, before legal use can recommence. Stress relief is usually required after rewelding. These are costly and time-consuming procedures.

Guided-float accumulators have generally utilized thinwalled metal floats which are subject to collapse should their vent holes become clogged. Replacement of floats which are damaged for this or any other reason has required cutting open and rewelding of the pressure vessel.

Folding float arrays offer the potential advantage of removability from a vessel through an access mouth without damage to the vessel. The array is inserted in folded condition and then unfolded for deployment. Removal is in the reverse sequence. Folding float arrays have long been used in various types of vessels but to date, so far as known, no practical folding float array has been successfully used in guided-float accumulators for high pressure hydraulic systems despite the need to avoid the costly and time-consuming procedures described above.

The present invention provides a float array which, although not foldable, is deployable within a guided float accumulator by (1) sequential insertion, part by part, through a mouth or port of the vessel and (2) subsequent assembly of the array within the pressure vessel by manipulation from the exterior of the vessel. The float array is removable by reversing the assembly procedure, and replacement or repair of damaged floats can be accomplished without cutting open the pressure vessel and destroying its A.S.M.E. coding and/or other applicable coding.

The present invention uses individual float elements made of buoyant foam material. These elements are shaped and sized to act effectively as elements of an assembled float array and also to be insertable and removable through a mouth or port of the pressure vessel and to be deployable within the vessel by manipulation from the exterior of the vessel. In addition, unlike a metal float, the buoyant foam float does not have vent holes that can clog.

The objects and advantages of the invention will be more fully understood from the following description of an example. This description refers to the accompanying drawings, in which.

Figure 1:
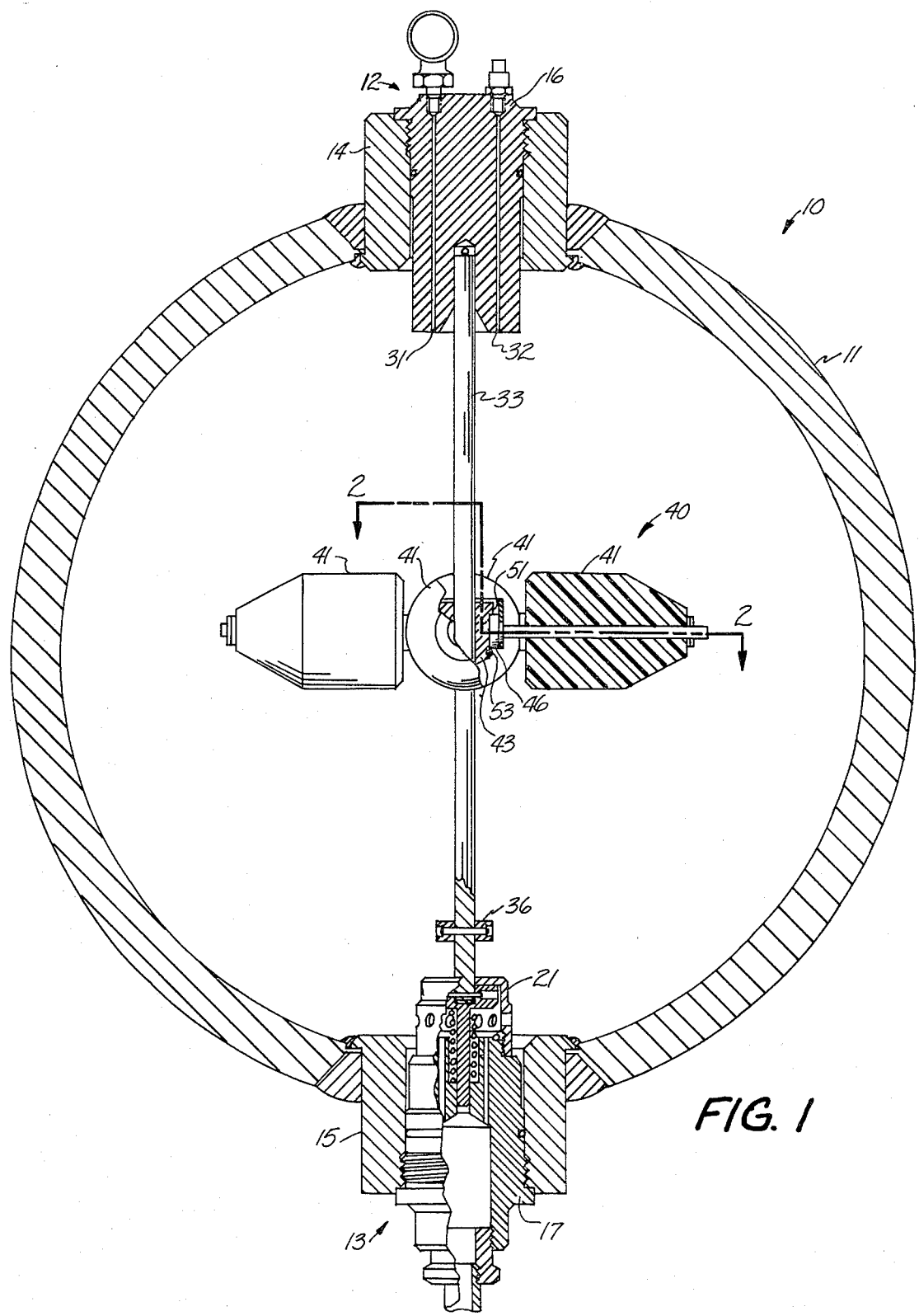
FIG. 1 is a sectional view through an accumulator embodying the invention.

Shown in FIG. 1 is an accumulator 10 comprising a spherical vessel 11 having upper and lower ports or mouths 12 and 13 defined respectively by upper and lower necks 14 and 15. The mouths 12 and 13 are closed respectively by plug bodies 16 and 17. The necks 14 and 15 are welded to the wall of the spherical vessel 11 as shown, and the plug bodies 16 and 17 are threadedly engaged in the necks 14 and 15. Suitable O-ring seals are provided between the plug bodies and necks as shown.

Figure 4:
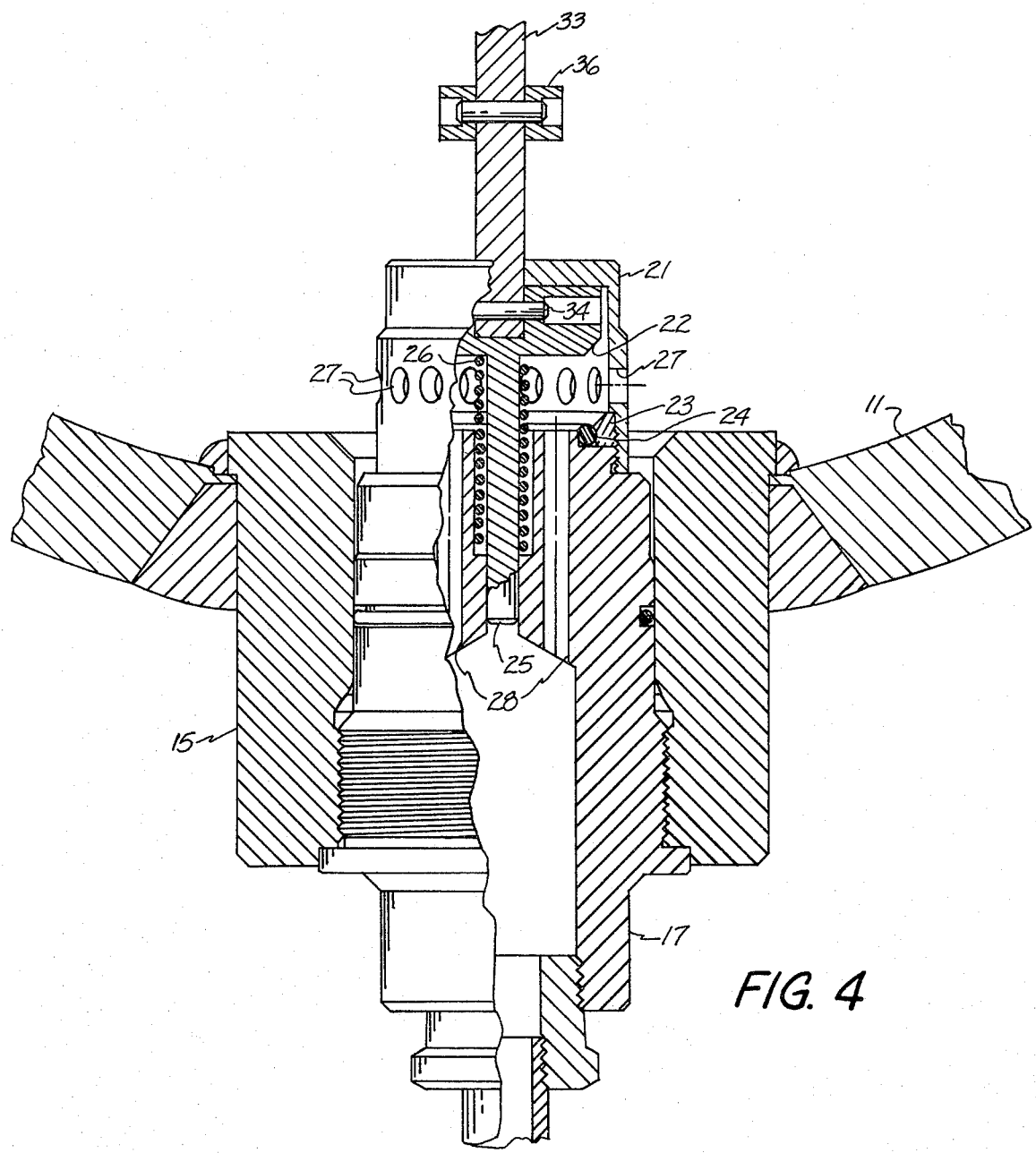
FIG. 4 is a detailed view on an enlarged scale of the lower portion of FIG. 1.

Fluid outlet means and a shut-off valve are associated with the lower plug body 17, as best seen in FIG. 4. The housing 21 for the shut-off valve is threadedly engaged on the lower plug body 17, and the valve 22 is adapted to seat against a seating insert 23 and an elastomeric seating ring 24 to provide a pressure-tight seal in the closed position of the valve member 22. The valve stem 25 is slidingly received in the lower plug body 17 and is surrounded by a valve spring 26 which biases the valve member 22 to its raised open position as shown. Fluid outlet means associated with the lower plug body 17 includes the outlet ports 27 formed in the valve housing 21, and longitudinal passages 28 formed in the plug body 17, and appropriate hydraulic connections and tubing associated with the lower end of the plug body 17 as shown.

The upper plug body 16 (FIG. 1) includes a pressure gage line 31 and a bleed line 32. A float guide rod 33 is slidingly received in the plug body 16 and is connected at its lower end by the pin 34 (FIG. 4) for vertical movement with the valve member 22.

A float array 40 surrounds the guide rod 33. The array includes four float elements 41 formed of foam material having high hydrostatic crush pressure such as syntactic foam material comprising extremely small hollow glass spheres of diameters not exceeding 200 microns, and high-strength epoxy resins. An example of such foam is sold as "ECCOFLOAT EL" by Emerson & Cuming, Inc., Canton, Mass.

Figure 2:
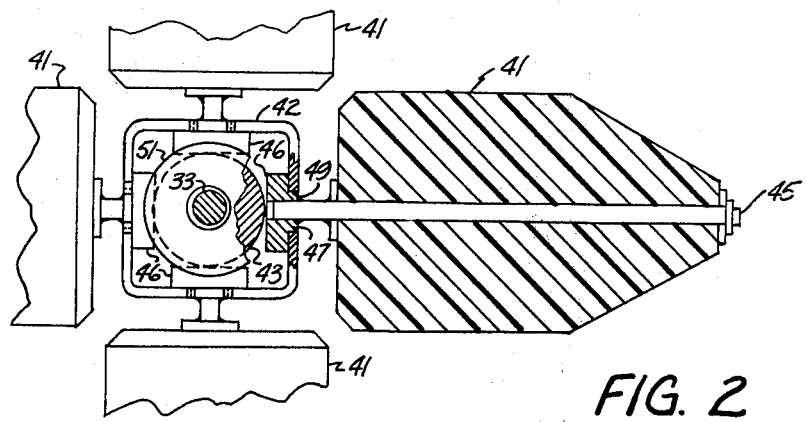
FIG. 2 is a view on an enlarged scale taken from line 2—2 in FIG. 1.
Figure 3:
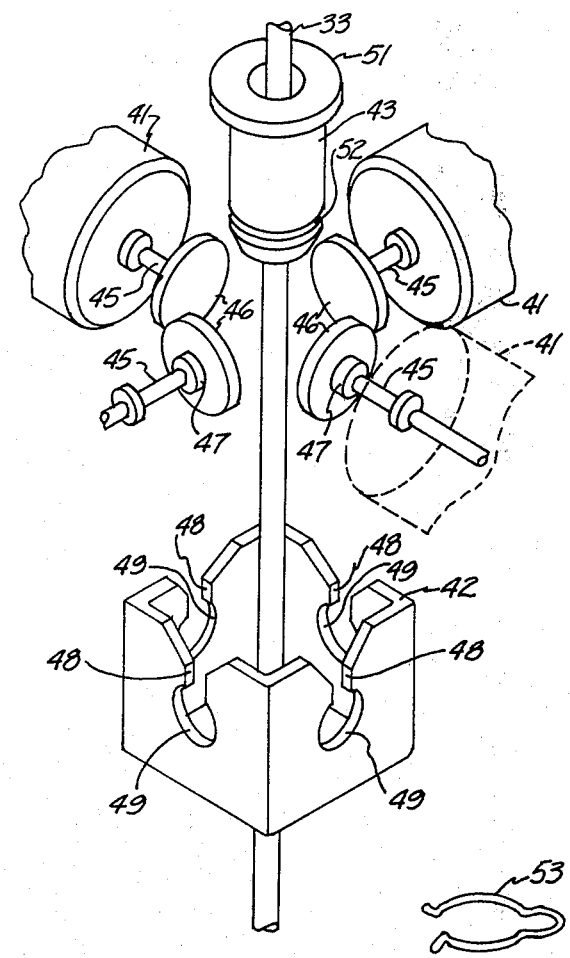
FIG. 3 is an isometric exploded view of the float array seen in FIGS. 1 and 2.

The float elements 41 are supported on collar means which includes a collar strap 42 surrounding the guide rod 33. A collar plug 43 also surrounds the guide rod 33 and is itself surrounded by the collar strap 42 when the float array is deployed. The float elements 41 are directly carried on mounting rods 45 whose inboard ends carry locking discs 46 and locking shoulders 47. Slots 48 (FIG. 3) formed in the collar strap 42 have a width just exceeding the diameter of the mounting rods 45. The slots 48 open into sockets 49 which are of a diameter to snugly receive the locking shoulders 47. As best seen in FIG. 2, the thickness of the locking discs 46 along the axial direction of the mounting rods 45 is just sufficient to lock the mounting rods 45 against axial movement when the locking shoulders 47 are inserted in the sockets 49 and the collar plug 43 is positioned within the collar strap 42. The collar plug 43 is provided with retainer members including an upper retainer flange 51 and a lower retainer groove 52 (FIG. 3) which receives a spring-wire retainer member 53 seen at the lower portion of FIG. 3 removed from the plug. As best seen in FIG. 1, the upper retainer flange 51 and the retainer member 53 in the lower retainer groove engage respectively the upper and lower edges of the locking discs 46 in the deployed condition of the array.

A collar 36 (FIGS. 1, 4) is pinned to the guide rod 33 in the manner shown. In the operation of the accumulator, as the level of hydraulic fluid (not shown) falls, the deployed float array moves downward on the guide rod 33. As the vessel continues to empty, the bottom end of the collar plug 43 engages the collar 36 and the guide rod 33 and valve member 22 begin to move downwardly under the weight of the float array and against the bias of the valve spring 26. As the float elements 41 come adjacent the bottom of the vessel 11, the valve member 22 reaches fully closed condition and seats against the seating insert 23 and the elastomeric sealing ring 24, preventing further emptying of the vessel 11. Upon resurgence of hydraulic pressure in the system to which the accumulator is connected, the weight of the float array is overcome and the valve reopens to allow hydraulic fluid to flow into the vessel chamber.

The float may be deployed within the vessel chamber prior to insertion of the plugs 16 and 17. In one sequence, the four float elements 41 may be sequentially inserted, each together with its mounting rod 45 and associated elements. The collar strap 42 and collar plug 43 are also inserted, and the float array is assembled within the vessel. The collar strap 42 and collar plug 43 are vertically displaced from each other to allow insertion of the mounting rods 45 through the slots 48 into the sockets 49 with the locking discs 46 and locking shoulders 47 positioned interiorly of the collar strap 42. The mounting rods 45 are then shifted outwardly to position the locking shoulders 47 in the sockets 49. The collar strap 42 and collar plug 43 are then brought together vertically to engage the locking discs 46 against the cylindrical side of the collar plug 43 and against the upper retainer flange 51 of the collar plug. The retainer member 53 is then inserted in the groove 52 to thereby engage the locking discs 46 and complete the locking of the float array 40 in deployed condition. These various manipulations may be performed by reaching through the open mouths 12 and 13 either manually or with appropriate tools. Then the plug body 16 is threaded into the upper neck 14 and the rod 33 is inserted from below and slipped through the plug 43 and into the illustrated slideway or socket at the bottom of plug body 16. When inserted, the rod 33 may have attached thereto the valve member 22, which in turn may be already associated with the valve housing 21 and plug body 17. The plug body 17 is then threaded into the lower neck 15 to complete the assembly.

Removal of the float array and redeployment following repair or replacement may be accomplished by reversing and then repeating the foregoing steps.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a guided-float accumulator comprising a vessel in the shape of a cylinder or sphere adapted to contain high fluid pressures, mouth means for the vessel including at least a fill mouth at the bottom of the vessel, fluid outlet means associated with closure means for the fill mouth for connection of the vessel and its contents to a hydraulic system such as used in an oil well blowout preventer, a normally open shut-off valve associated with the fill mouth in series with the fluid outlet means, and float means movable in the vessel along a vertical guide member according to the liquid level within the vessel to thereby close off the shut-off valve and prevent the escape of pressurized gas from the vessel into the hydraulic system proper when the liquid level within the vessel becomes low, the fluid outlet means and shut-off valve being removable from the association with the fill mouth to open the fill mouth when the system is shut down for repair, the improvement which comprises provision of the float means as a float array comprising a plurality of float elements supported on collar means surrounding the vertical guide member, said float elements being sequentially removable and insertable through said mouth means for the vessel, said collar means and vertical guide member also being removable and insertable through said mouth means, interlock means associated with said collar means and each of said float elements for deploying said float elements as a generally horizontal array radiating from said collar means, said interlock means being manipulatable from the exterior of said vessel through said mouth means to couple said interlock means following insertion of one or more of said float elements and said collar means and vertical guide member, and to uncouple said interlock means for removal and replacement of one or more of said float elements.

2. Apparatus as in claim 1, in which said float elements are formed of pressure-resistant syntactic foam material.

3. Apparatus as in claim 2, in which such collar means includes a collar plug closely surrounding the vertical guide and a collar strap spacedly surrounding the vertical guide member, locking members fixed at the radially inner ends of the float elements, said locking members being clampable between the collar plug and collar strap upon vertical alignment of the plug and strap into clamping position relative to each other, and releasable retainer means for maintaining said clamping position during operation of the float.

4. Apparatus as in claim 3, in which said mouth means includes both said fill mouth at the bottom of the vessel and also an auxiliary mouth at the top of the vessel, and closure means receivable in said auxiliary mouth and in turn receiving said vertical guide member.

5. Apparatus as in claim 4, in which said vertical guide member is fixed to a valving element of the shut-off valve for vertical movement with such valving element, said closure means for said auxiliary mouth being adapted to slidingly receive and support the upper end of said vertical guide member.

6. A guided-float accumulator comprising a vessel in the shape of a cylinder or sphere adapted to contain high fluid pressures, mouth means for the vessel comprising a fill mouth at the bottom of the vessel and an auxiliary mouth at the top of the vessel, removable closure means received in each said mouth, fluid outlet means associated with the closure means for the fill mouth for connection of the vessel and its contents to a hydraulic system such as used in an oil well blowout preventer, a normally open shut-off valve associated with the fill mouth in series with the fluid outlet means, and float means movable in the vessel along a vertical guide member according to the liquid level within the vessel to thereby close off the shut-off valve and prevent the escape of pressurized gas from the vessel into the hydraulic system proper when the liquid level within the vessel becomes low, the fill mouth and the auxiliary mouth each being openable when the system is shut down for repair, the closure means in the auxiliary mouth slidingly receiving and supporting the upper end of said vertical guide member, the float means consisting of a float array comprising a plurality of float elements of pressure-resistant syntactic foam material supported on collar means surrounding the vertical guide member, said vertical guide member being fixed to a valving element of the shut-off valve for vertical movement with such valving element, said float elements being sequentially removable and insertable through said mouth means for the vessel, said collar means and vertical guide member also being removable and insertable through said mouth means, said collar means including a collar plug closely surrounding the vertical guide and a collar strap spacedly surrounding the vertical guide member, locking members fixed at the radially inner ends of the float elements, said locking members being clampable between the collar plug and collar strap upon vertical alignment of the plug and strap into clamping position relative to each other, releasable retainer means for maintaining said clamping position during operation of the float, whereby said float elements are deployable as a generally horizontal array radiating from said collar means, said collar means, locking members, and retainer means being manipulatable from the exterior of said vessel through said mouth means to connect said collar means and float elements following insertion of one or more of said float elements and said collar means and vertical guide member, and to uncouple said collar means and float elements for removal and replacement of one or more of said float elements.

\* \* \* \* \*